COMPUTER HAVING FOUR-FUNCTION ARITHMETIC UNIT

Filed June 29, 1964

3 Sheets-Sheet 1

Inventor:
WOLFGANG BÖHM

By Spencer & Kaye
Attorneys

April 18, 1967 W. BÖHM 3,315,069

COMPUTER HAVING FOUR-FUNCTION ARITHMETIC UNIT

Filed June 29, 1964

3 Sheets-Sheet 2

Inventor:
WOLFGANG BÖHM

By Spencer & Kaye
Attorneys

April 18, 1967 W. BÖHM 3,315,069

COMPUTER HAVING FOUR-FUNCTION ARITHMETIC UNIT

Filed June 29, 1964 3 Sheets-Sheet 3

Inventor:
WOLFGANG BÖHM
By Spencer & Kaye
Attorneys

United States Patent Office 3,315,069

Patented Apr. 18, 1967

3,315,069

COMPUTER HAVING FOUR-FUNCTION ARITHMETIC UNIT

Wolfgang Böhm, Berlin-Zehlendorf, Germany, assignor to Telefunken Patentverwertungsgesellschaft m.b.H., Ulm (Danube), Germany Filed June 29, 1964, Ser. No. 378,747
Claims priority, application Germany, June 28, 1963, T 24,208
20 Claims. (Cl. 235—164)

The present invention relates generally to the computer or data processing art, and, more particularly, to an electronic arithmetic unit which can accomplish the four basic arithmetic functions and having registers in which the numbers to be calculated are presented in binary-coded form and in which the numerical results appear.

A four-function arithmetic unit generally is a structural component of a larger arithmetic system in which still other structural components, such as input keying devices and output printers are provided. The arithmetic unit transfers the numbers to be calculated and the preselected arithmetic instruction from the input components into the registers, and after the arithmetic process it retains the numerical results in readiness in one of the registers for transmittal to the output components.

Four-function electronic arithmetic units have already been known in which the registers cooperate with an arithmetic circuit by means of a command or program control device. The command control device is caused to produce control pulse sequences by means of the arithmetic instruction, for example, multiplication, and numerous elementary operations are triggered in such a chronological sequence that the desired arithmetic instruction is carried out. Since the control device requires considerable technical expenditure, there is a desire to simplify the control device as much as possible. However, the simplification was previously possible only up to a limit determined by the extensively differing operations for the four basic functions of arithmetic.

With this state of the prior art in mind, it is a main object of the present invention to provide a four-function arithmetic unit which considerably surpasses the previous limit on simplification.

Another object of the present invention is to eliminate the command control device which had been utilized previously to accomplish the arithmetic functions as mentioned above.

These objects and others ancillary thereto are accomplished in accordance with preferred embodiments of the invention wherein the arithmetic circuit is constructed so that only the arithmetic instruction $$(a \pm b)\frac{d}{c} \longrightarrow a$$

is applied to the contents of the registers. In order to carry out one of the basic types of arithmetic, two registers are always filled with unit values and/or with zero (0). It should be understood that *a*, *b*, *c*, and *d*, indicate the contents of the four registers and preferablyy the registers A, B, C, and D, respectively, whereas the arrow can be read "result appears as" and in the above instruction this means that the arithmetic result appears as "*a*" or the contents of register A.

Therefore, the basic feature of the present invention is to fixedly connect the four registers in accordance with the above arithmetic instruction and to select one of the arithmetic functions, i.e., addition/subtraction, multiplication or division, solely by the fact that the figures to be calculated arrive at the correct registers before or at the beginning of the calculation process. For example, addition is accomplished by having the figures to be calculated placed into the registers A and B, while the remaining two registers are provided with unit values.

For the adding operation it would actually be sufficient if the contents of the remaining registers C and D were equal to each other, i.e., there is great freedom regarding the selection of figures which provide the unit values. As a further feature of the invention, however, these values are used for normalizing digits which are placed into the device in floating point decimal notation. This is done by providing that the unit digits indicate the position of a number with regard to the point in the form of a "1" in the digit position assigned to the unit or "ones" place of the number. Thus, for the user the arithmetic unit operates as a floating point arithmetic unit, and there are no internal special elements provided which otherwise are necessary to serve for normalizing.

The result is always noted in the same point position in register A which was chosen for the number first placed into the register. Therefore, it is preferable to make this point position optically visible, for example, with the aid of a mechanical decimal point shifter or a so-called arithmetic unit decimal point.

The arithmetic unit for the addition operation is longer in the arithmetic unit of the present invention than if an arithmetic operation especially used for adding operations was selected. However, this time requirement is not important with the high shift frequencies of electronic components, at least not in cases where the arithmetic unit is operated manually by means of a keying unit, since the human reaction time is, by orders of magnitude, longer than the period of a shift pulse. With the present invention there is an arithmetic unit provided which makes it possible to fully utilize the speed of electronic components also for key controlled systems. In that case a somewhat more cumbersome arithmetic operation can be tolerated if, as a compensation, only very few elements are required to carry out this arithmetic operation. It will be shown below that the arithmetic operation accomplished by using the present invention not onlyy fulfills all of the requirements of the user, but can also be carried out almost without any program or command control means. Furthermore, the distinction between addition and subtraction is realized in an extremely simple manner in accordance with the double sign or plus-minus sign in the above-mentioned arithmetic instruction, especially in the case of serially-operated arithmetic units.

Additional objects and advantages of the present invention will become apparent upon consideration of the following description when taken in conjunction with the accompanying drawings in which.

Figure 1:
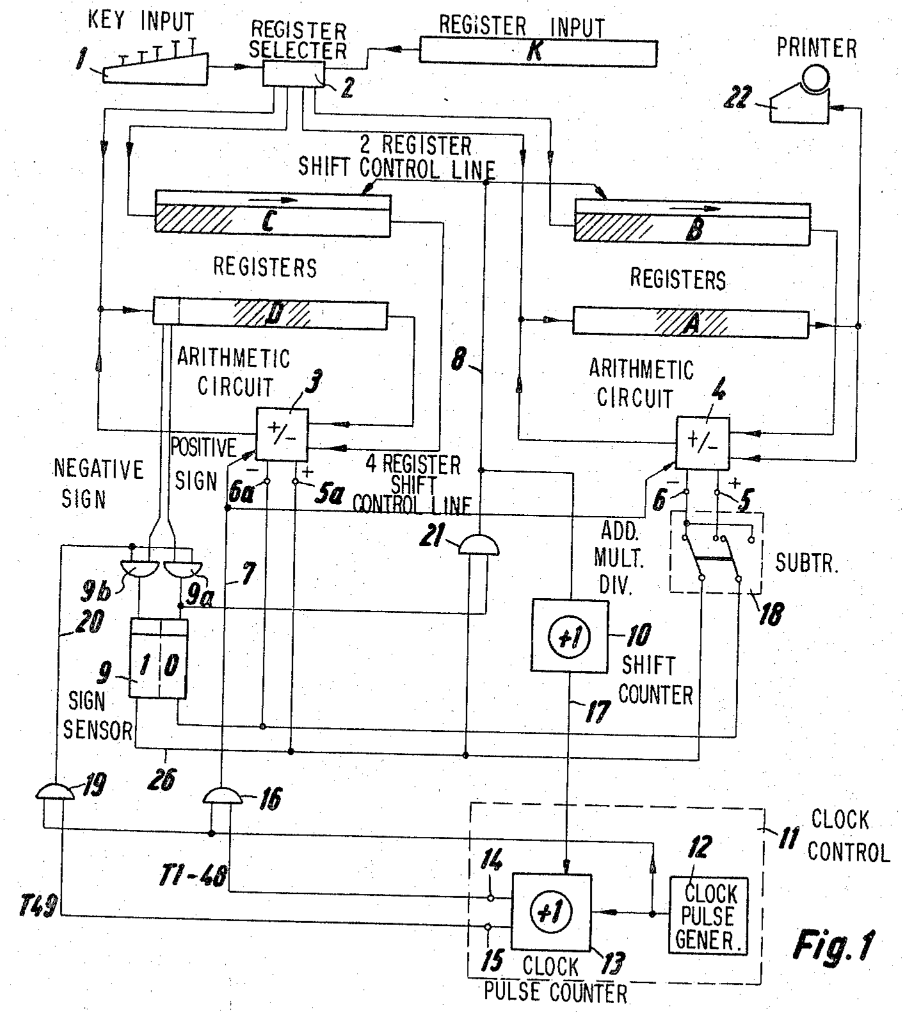
FIGURE 1 is a block circuit diagram of one embodiment of a four-function arithmetic unit constructed in accordance with the present invention.

With more particular reference to the drawings, FIGURE 1 illustrates an embodiment of the invention wherein four registers A, B, C, and D, are shown, each having a number of digit positions which is a multiple of the largest number of positions permissible for the operands which are to be calculated. Generally, in arithmetic units with a fixed number of digit positions a fixed word length is meant. The operands can then maximally fill the length of one word. The registers of the arithmetic unit of the present invention are of multiple length and in the embodiment disclosed in FIGURE 1 they are considered to have the length of three words.

The input of numbers into the registers can be accomplished from a key-operated unit 1 or from further registers of which one register K is shown. A register selector or distributor 2 carries out the connection of the input means to a selected register.

In order to illustrate the invention in a simple manner, it is assumed in the following discussion that the arithmetic unit is serially operated. An adding circuit includes a full adder which has a feedback arrangement and the digit transmission lines need not be multiple lines either.

The registers are connected in pairs with arithmetic circuits 3 and 4, respectively, in order to carry out the arithmetic function in accordance with the present invention. One of the arithmetic circuits 3 in one computing step connects the digits in registers C and D, selectively, in additive or subtractive manner and inserts the results in register D. The other arithmetic circuit 4 connects selectively, additively or subtractively, the registers A and B and inserts the result of the computation in register A. The two arithmetic circuits for the purely binary series representation are only so-called full adders whose carry output is internally fed back by means of a delay circuit.

With the use of such a full adder the figures which are present in the two registers assigned thereto are added up beginning with the lowest digit position. If subtraction is to be carried out, the circuit of the full adder changes in only a few details. The logic function for the output of the full adder is even maintained in its entirety because when adding as well as when subtracting binary numbers, a "1" appears at the output of the full adder only if an odd number of logic 1 inputs is present. The carry, in case of addition, results when at least two "1" inputs are present, while the carry in case of subtraction (which carry must be considered negative) must be formed if the sum from the binary digit to be subtracted and the previous carry is larger than the subtrahend digit. The arithmetic circuit 4 or 3, respectively, has two control inputs 5, 6, and 5*a*, 6*a*, respectively, of which one is always actuated or energized and indicates whether an addition or a subtraction is to be carried out.

The entire synchronization of the arithmetic circuit is ensured by a line 7 by which the clock pulses are fed. Each clock pulse on line 7 provides that the digits in the four registers are shifted to the right by one digit position, so that the lowest value digits are fed to the arithmetic circuit. This clock pulse also provides that the resultant digit arrives at the next digit position of the register A or D, respectively.

The two arithmetic circuits 3 and 4 thus always operate synchronously. An arithmetic or calculating step in the following explanation should always be taken to mean the addition or subtraction, respectively, of two registers A and B or C and D, respectively, which registers are assigned to each other.

Although the digits in all four registers are always shifted to the right together via the clock pulse provided by the clock line 7, the registers B and C are provided with another manner of shifting. A shift pulse can be fed to these two registers by a line 8 which makes it possible that the digits in these registers are also synchronously shifted to the right by one digit position and this operation is called a shifting step.

Figure 2:
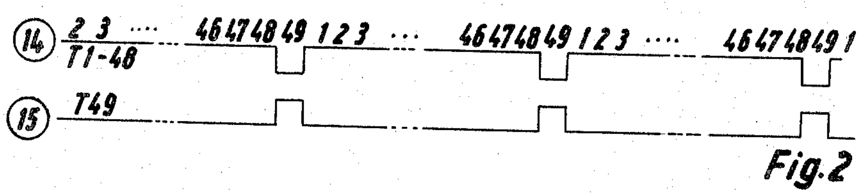
FIGURE 2 illustrates two explanatory pulse diagrams to be considered in connection with FIGURE 1.

In the following description it will be seen that an arithmethic process can be provided by suitably controlling the arithmetic steps and the shifting steps, and which fulfills the desired task of a four-function arithmetic unit. The control of the arithmetic operation is extremely simple. The control device includes essentially a bistable element 9 or a sign sensor which monitors the plus or minus sign of the number present in register D. Also included is a shift counter 10 which counts the number of two register shifting steps and interrupts or stops the arithmetic process as being finished after a certain number of steps. Furthermore, there is a clock control 11 which provides the chronological control of the entire arithmetic unit. This clock control includes a clock pulse generator 12 and a clock pulse counter 13 which counts the individual clock pulses and delivers at its two outputs 14 and 15 patterns of pulses for operating the arithmetic unit, and these are indicated in FIGURE 2.

In the following description of the invention it is assumed that there is a word length of 16 digit positions so that the four registers, because they each have a length of three words, have forty-eight digit positions each. The clock pulse counter delivers a wave of pulses in a particular pulse pattern at its first output 14, and this opens an AND-gate 16 which is connected to this output. The AND-gate is open during forty-eight clock pulse intervals and is then closed during the forty-ninth clock pulse interval as shown in the upper diagram of FIGURE 2. The clock pulse counter counts modulo 49 and is blocked and opened, respectively, by the shift counter 10 by means of the output line 17 of the shift counter. The shift counter monitors thirty-two two-register shifting steps during which the digits in the registers B and C are shifted to the right by thirty-two digit positions.

At the start of the calculating process, the numbers which are to be calculated and which are at the most sixteen position digits, are fed into the four registers in positions thereof as indicated by the shading in FIGURE 1. As shown, in registers A and D, only the central third of the register is occupied while in the other two registers only the highest position region is filled which is shown on the left of the registers in this figure. During the course of the arithmetic process the numbers or digits travel in registers B and C in the direction toward the lower digit positions until they arrive unchanged in the right-hand third where the shift counter then terminates the calculation after thirty-two shifts. The registers B and C are connected to form ring counters so that their contents is not varied by the computing operation.

The clock pulse line 7 is connected to receive the output of AND-gate 16 and in each calculating step transmits successively forty-eight pulses to the arithmetic circuits. Thus, if the digits had been fed to the device and the first computing step starts, for example, by actuating the clock pulse counter 13, the forty-eight digit positions of the registers D and C or A and B, respectively, arrive in pairs at the arithmetic circuits 3 or 4, respectively, while at the same time the result of the arithmetic operations arrives at the registers D and A. At first the arithmetic circuit 3 always carried out subtraction, and this is achieved by exciting the control input 6*a* for the arithmetic circuit 3 by means of the bistable control element or sign sensor 9. This control input 6*a* of the arithmetic circuit is connected with that output of the bistable element 9 which is excited in the rest condition. The control input 5*a* which provides for addition is connected with the output which is complementary with the first-mentioned output and by means of a line 26.

These same outputs of the bistable element are also connected with the control inputs of the other arithmetic circuit. This is accomplished by means of a throw-over switch 18 which is illustrated in position for an adding operation so that the arithmetic process is initiated by an adding step. In order to carry out a subtraction operation, the throw-over switch 18 will be brought into the other position so that the arithmetic operation is initiated by a subtraction step. Switch 18 though illustrated as a mechanical switch, may also be an electronic switch.

Each time the bistable control element 9 changes its condition, the arithmetic circuit 3 and 4 are changed to their opposite function so that in each of the arithmetic circuits if it had previously been controlled to add, it will be changed to subtract and vice versa. The bistable element 9 is, in turn, set anew by the plus or minus sign which is present in register D after each arithmetic step. For this purpose the second output 15 of the clock pulse counter 13, having an output curve as shown in the lower diagram of FIGURE 2, is connected with an AND-gate 19 so that each forty-ninth clock pulse is transmitted to a clock pulse line 20 which makes the plus or minus sign of register D effective upon the bistable element 9, via two AND-gates 9*a* and 9*b*. In order to control the shifting steps in registers B and C via the line 8, only a single further AND-gate 21 is needed which is opened during the forty-ninth clock pulse when the sign in register D changes from negative to positive.

Thus in summary, it should be considered that the parts of the device operate as follows:

(a) computing steps are carried out until the sign in register D has become negative;

(b) then, addition and substration steps are exchanged and a computing step takes place by means of which the sign in register D again become positive, and this is resetting of the positive remainder; and (c) then a two-register shifting step takes place for registers B and C whereupon the operation is started again is mentioned above in paragraph (a).

By using a suitable input of the arithmetic values together with unit values or zeroes into the registers, one of the basic calculating functions of addition/subtraction, multiplication, or division, is selected. After thirty-two shifting steps, the result will always be present in the shaded area of register A, shown in FIGURE 1.

shaded regions thereof. For the sake of simpler illustration, it is assumed in the tables that the word length is limited to six decimal digits, and the length of the individual registers would then be limited to eighteen decimal positions. In this case instead of a periodic pulse sequence of 49 pulses, as shown in FIG. 2, a periodic pulse sequence of 73 pulses is established. In register C, the decimal point of the number in register B appears as a "1" at that position which corresponds to the "ones" position in register B. Thus, since the "1" of register C corresponds to the "ones" place in register B, it is therefore known that the next-following digit will be one which is to be considered as appearing after the decimal point. The same is true with respect to register D, for the decimal point position for the number in this register is indicated in register A. These preparations are carried out with the use of the key input or keying device 1 and the register distributor 2.

After these preparations, the first computing step begins in which the contents *c* of the register C is subtracted from contents *d* of register D, and at the same time the contents *b* of register B is added to the contents *a* of register A. After 18.4=72 individual pulses a computing step is finished. Upon the seventy-third clock pulse, the bistable element 9 is actuated to sense the sign of register D and the bistable element changes its condition because the number in register C is larger than that in register D and therefore the sign in register D has changed.

TABLE I.—(ADDITION 38.8+25.6=64.4)

| Reg. | Contents | Contents | Reg. | Operation |
|---|---|---|---|---|
| C | 000010000000000000 | 000388000000000000 | B | |
| D | 000000000010000000 | 000000000256000000 | A | |
| | d−c→d | a+b→a | | Computing step |
| D | 999990000010000000 | 000388000256000000 | A | |
| | d+c→d | a−b→a | | Reset—change in sign |
| D | 000000000010000000 | 000000000256000000 | A | |
| | (1/10)c→c | 1(/10)b→b | | Shift |
| C | 000001000000000000 | 000038800000000000 | B | |
| | d−c→d | a+b→a | | Computing step |
| | d+c→d | a−b→a | | Reset—change in sign |
| | (1/10)c→c | (1/10)b→b | | Shift |
| | d−c→d | a+b→a | | Computing step/Reset/Shift |
| | d+c→d | a−b→a | | |
| | . . . | . . . | | . . . |
| C | 000000000010000000 | 000000000388000000 | B | |
| D | 000000000010000000 | 000000000256000000 | A | |
| | d−c→d | a+b→a | | Computing step |
| D | 000000000000000000 | 000000000644000000 | A | |
| | d−c→d | a+b→a | | Computing step—No change in sign |
| D | 999999999990000000 | 000000001032000000 | A | |
| | d+c→d | a−b→a | | Reset—Change in sign |
| D | 000000000000000000 | 000000000644000000 | A | |
| | (1/10)c→c | (1/10)b→b | | Shift |
| | d−c→d | a+b→a | | Computing step/Reset/Shift |
| | d+c→d | a−b→a | | |
| | . . . | . . . | | . . . |
| C | 000000000000000010 | 000000000000000388 | B | Result after 12 Shifting Operations |
| D | 000000000000000000 | 000000000644000000 | A | |

The above-described calculating process of the present invention not only provides a simple arithmetic device for binary notation but can also be applied to numerous other digit systems which will be demonstrated below with refence to the most important digit system, the decimal system. In this example, the decimal digits may be considered to be coded in tetrads. The block diagram of FIGURE 1 can be considered in the sense of a decimal arithmetic device by providing the registers with tetrad inputs and outputs and by constructing the arithmetic circuits to be able to add tetrad-coded decimal digits. The computing process in decimal notation can thus be illustrated using a computing example for each of the basic arithmetic functions.

*Addition function* (*See Table I—Col. 6*)

The two number to be added are 38.8 and 25.6, and these numbers are fed to the registers A and B in the The next computing step is then carried out by cancelling the effect of the previous computing step or calculating step and this step is called "resetting." In this operation the adding and subtracting functions of the adders are reversed and the sign in register D is again changed, and this time from negative to positive. In the clock interval forty-nine of this computing step, the condition for AND-gate 21 is fulfilled and the contents of the registers B and C is shifted by line 8 by one digit position, while at the same time the shift counter 10 notes that one counting step has been taken. In the table, this is indicated by 1/10. The partial computing operation which has been described thus far is continued and repeated until, after a number of shifting operations of the register C, the indication for the decimal point positions of the two operands are located in digit positions which correspond to each other. The subtraction (*d–c*) which now follows does not yield a change in sign. The two operands which are present in the registers A and B are added and no resetting takes place. The desired result is then available in register A. The decimal point of the resultant figure is still determined by the decimal point marker in register D which has been maintained unchanged.

Although the calculation result is now already provided, the computing operation is continued because, in accordance with the present invention, it is desired to provide an identical calculation operation for all four basic functions of arithmetic. The following calculation, however, has no further influence upon the result and consists solely in a computing step, a resetting step, and a shifting step following one another until the shift counter 10, because of the continuous shifting operations, has finished counting and terminates the computing operation.

*Subtraction function* (*See Table II—Col. 7*)

The minuend 38.8 is placed into the shaded region of register A and its "ones" digit is again marked by a "1" as previously in register D. The subtrahend 25.6 is placed into the shaded area of register B and its decimal point is similarly noted in register C. In order to carry out subtraction, the switch 18 is moved from the position shown in FIGURE 1 so that in the first computing step subtraction is provided in the arithmetic circuit 4, instead of addition, as would otherwise be the case. Now the same procedure of computing step, resetting step, and shifting is carried out as mentioned above, until two decimal point positions in registers C and D correspond to each other.

cates the decimal point for the answer in register A. The subsequent computing operation has no further influence on the result as was the case in the addition process and merely affects the counting to the end of shift counter 10.

*Multiplication function* (*See Table III—Col. 9*)

The multiplicand 38.8 is fed by key means into the shaded region of register B and its decimal point position is noted in register C as in the above arithmetic functions. In contradistinction to addition and subtraction, the second operand, the multiplier 25.6 is fed to the shaded region of register D while register A is entirely filled with zeroes. The result is accumlated in register A in the same relative positions as the multiplier in register D.

The switch 18 is placed in the "addition" position, that is, in the first computing step an addition is carried out. The first computing step again is reset as described above. After shifting, further computing steps follow with resetting and shifting until the decimal point in register C has arrived at the same position in which the first essential digit is located in register D. The next following computing step does not provide a change in sign in register D so that the addition result $(a+b)$ is held in register A and at once a further computing step follows which also does not yet provide a change in sign. Only in the next computing step does the sign change so that a resetting and a shifting step follows.

Corresponding to the unit digit 5 in the multiplier, five effective computing steps are carried out before the sign

TABLE II—(SUBTRACTION 38.8—25.6=13.2)

| Reg. | Contents | Contents | Reg. | Operation |
|---|---|---|---|---|
| C | 000010000000000000 | 000256000000000000 | B | |
| D | 000000000010000000 | 000000000388000000 | A | Computing step |
| | d−c→d | a−b→a | | |
| D | 999990000010000000 | 999744000388000000 | A | Reset—change in sign |
| | d+c→d | a+b→a | | |
| D | 000000000010000000 | 000000000388000000 | A | Shift |
| | (1/10)c→c | (1/10)b→b | | |
| C | 000001000000000000 | 000025600000000000 | B | Computing step |
| | d−c→d | a−b→a | | Reset—Change in sign |
| | d+c→d | a+b→a | | Shift |
| | (1/10)c→c | (1/10)b→b | | Computing step/Reset/Shift |
| | d−c→d | a−b→a | | |
| | d+c→d | a+b→a | | |
| | ⋮ | ⋮ | | ⋮ |
| C | 000000000010000000 | 000000000256000000 | B | |
| D | 000000000010000000 | 000000000388000000 | A | Computing step |
| | d−c→d | a−b→a | | |
| D | 000000000000000000 | 000000000132000000 | A | Computing step—No change in sign |
| | d−c→d | a−b→a | | |
| D | 999999999990000000 | 999999999876000000 | A | Reset—Change in sign |
| | d+c→d | a+b→a | | |
| D | 000000000000000000 | 000000000132000000 | A | Shift |
| | (1/10)c→c | (1/10)b→b | | Computing step |
| | d−c→d | a−b→a | | Reset |
| | d+c→d | a+b→a | | Shift |
| | (1/10)c→c | (1/10)b→b | | Computing step/Reset/Shift |
| | d−c→d | a−b→a | | |
| | d+c→d | a+b→a | | |
| | ⋮ | ⋮ | | ⋮ |
| C | 000000000000000010 | 000000000000000388 | B | Result after 12 Shifting Operations |
| D | 000000000000000000 | 000000000132000000 | A | |

The next following computing step produces the subtraction proper and provides the final result in register A, and the decimal point position of register D indi- in register D changes again, that is, six actual additions of $a$ and $b$ are provided and one subtraction of $b$ from $a$ is provided so that there are effectively five addition steps. Subsequent to resetting and shifting, there are six further effective computing steps which follow in accordance with the lowest value multiplier position.

D as previously the multiplier was fed into this register, and the register A is filled with zeros. The divisor 38.8 is provided in the shaded region of register C and the

TABLE III—(MULTIPLICATION 38.8 · 25.6=993.28)

| Reg. | Contents | Contents | Reg. | Operation |
|---|---|---|---|---|
| C | 000010000000000000 | 000388000000000000 | B | |
| D | 000000000256000000 | 000000000000000000 | A | |
| | d−c→d | a+b→a | | |
| D | 999990000256000000 | 000388000000000000 | A | Computing step |
| | d+c→d | a−b→a | | |
| D | 000000000256000000 | 000000000000000000 | A | Reset—change in sign |
| | (1/10)c→c | (1/10)b→b | | |
| C | 000001000000000000 | 000038800000000000 | B | Shift |
| | | | | Computing step/Reset/Shift, etc. |
| | . . . | . . . | | . . . |
| C | 000000000100000000 | 000000003880000000 | B | |
| D | 000000000256000000 | 000000000000000000 | A | |
| | d−c→d | a+b→a | | |
| D | 000000000156000000 | 000000003880000000 | A | Computing step |
| | d−c→d | a+b→a | | |
| D | 000000000056000000 | 000000007760000000 | A | Computing step—No change in sign |
| | d−c→d | a+b→a | | |
| D | 999999999956000000 | 000000116400000000 | A | Computing step—No change in sign |
| | d+c→d | a−b→a | | |
| D | 000000000056000000 | 000000007760000000 | A | Reset—Change in sign |
| | (1/10)c→c | (1/10)b→b | | |
| C | 000000000010000000 | 000000000388000000 | B | Shift |
| | d−c→d | a+b→a | | Computing step |
| | d−c→d | a+b→a | | Computing step |
| | d−c→d | a+b→a | | Computing step |
| | d−c→d | a+b→a | | Computing step |
| | d−c→d | a+b→a | | Computing step |
| | d−c→d | a+b→a | | Computing step |
| D | 999999999996000000 | 000000100880000000 | A | |
| | d+c→d | a−b→a | | |
| D | 000000000006000000 | 000000009700000000 | A | Reset—Change in sign |
| | (1/10)c→c | (1/10)b→b | | Shift |
| | d−c→d | a+b→a | | Computing step |
| | d−c→d | a+b→a | | Computing step |
| | d−c→d | a+b→a | | Computing step |
| | d−c→d | a+b→a | | Computing step |
| | d−c→d | a+b→a | | Computing step |
| | d−c→d | a+b→a | | Computing step |
| | d−c→d | a+b→a | | Compuslug sscp |
| | d−c→d | a+b→a | | Computing step |
| D | 999999999999000000 | 000000009971600000 | A | |
| | d+c→d | a−b→a | | |
| D | 000000000000000000 | 000000009932800000 | A | Reset—Change in sign |
| | (1/10)c→c | (1/10)b→b | | Shift |
| | d−c→d | a+b→a | | Computing step |
| | d+c→d | a−b→a | | Reset |
| | (1/10)c→c | (1/10)b→b | | Shift |
| | d−c→d | a+b→a | | Computing step |
| | d+c→d | a−b→a | | Reset |
| | | | | Shift, etc. |
| | . . . | . . . | | . . . |
| C | 000000000000000010 | 000000000000000388 | B | Result after 12 Shifting Operations |
| D | 000000000000000000 | 000000009932800000 | A | |

During these computing steps, the contents of register D is diminished and the product in register A is built up. The remaining shifting steps must then follow before the shift counter 10 provides the end of the computing process and the result is, as above, not influenced any more by the final steps. The result appears in that portion of register A which corresponds to the portion of register D in which the multiplier had been placed.

*Division function* (*See Table IV—Col. 11*)

The dividend 25.6 is fed into the shaded area of register decimal point of the divisor is indicated in the shaded region of register B. The computing operation is the same as that of the addition and multiplication as described above. The subtractions (*d*—*c*) result in a change in sign and thus effect resetting and shifting and this continues until the contents of register C is smaller in amount than the contents of register D. Only at this time in the operation is the result begun to be built up in register A and at this time the highest value decimal position of the result is formed. The sign again changes in register D and a resetting and shifting step takes place.

TABLE IV—(DIVISION 25.6:38.8=0.6597938, REMAINDER $56.10^{9}$)

| Reg. | Contents | Contents | Reg. | Operation |
|---|---|---|---|---|
| C | 000388000000000000 | 000010000000000000 | B | |
| D | 000000000256000000 | 000000000000000000 | A | |
| | d−c→d | a+b→a | | Computing step |
| D | 999612000256000000 | 000010000000000000 | A | |
| | d+c→d | a−b→a | | Reset—change in sign |
| D | 000000000256000000 | 000000000000000000 | A | |
| | (1/10)c→c | (1/10)b→b | | Shift |
| C | 000038800000000000 | 000010000000000000 | B | Computing step/Reset/Shift, etc. |
| | ⋮ | ⋮ | | ⋮ |
| C | 000000000038800000 | 000000000001000000 | B | |
| | d−c→d | a+b→a | | Computing step |
| D | 000000000217200000 | 000000000001000000 | A | |
| | d−c→d | a+b→a | | Computing step—No change in sign |
| D | 000000000178400000 | 000000000002000000 | A | |
| | d−c→d | a+b→a | | Computing step |
| | d−c→d | a+b→a | | Computing step |
| | d−c→d | a+b→a | | Computing step |
| | d−c→d | a+b→a | | Computing step |
| | d−c→d | a+b→a | | Computing step |
| | d+c→d | a−b→a | | Reset—Change in sign |
| C | 000000000038800000 | 000000000001000000 | B | |
| D | 000000000023200000 | 000000000006000000 | A | |
| | (1/10)c→c | (1/10)b→b | | Shift |
| | | | | Computing step, etc. |
| | ⋮ | ⋮ | | ⋮ |
| C | 000000000000000388 | 000000000000000010 | B | Result after 12 Shifting Operations |
| D | 000000000000000056 | 000000000006597938 | A | |

Thus, six effective computing steps take place, that is, seven subtractions and one addition so that the number 6, which is the first significant digit of the result, is formed in register A before the above-mentioned sign change and resetting and shifting take place. Then, five further effective computing steps follow until the next change in sign, then nine effective steps etc., until the shift counter indicates the end of the operation. The result then appears in register A in the same decimal point position as was determined in register D for the dividend.

Thus, it can be seen that all four basic functions of arithmetic can be carried out with the same and easily controllable computing operation and it is possible, for the first time, to fully utilize the high computing speed of modern electronic components with key-controlled computing units and with the expediture in control devices being, desirably, very small.

It has been assumed above that as the starting point, the numbers to be calculated are already present in the registers at a suitable location. However, this is accomplished in a key control device only by pressing a corresponding operating key. It may be assumed that one of the numbers is already available in register A as the result of a preceding computation, or that it was transferred into this register by an input operation. As the next step, the operator presses the desired operating key so that the register distributor 2 opens the correct path for this operation and correspondingly fills the registers. During the keying in of the second operand, the decimal point is keyed in on a special key having the designation "decimal point" in the manner of a floating point operation. By means of this process, a "1" of the number system used appears in the register connected to receive the mark for the decimal point. The decimal point position of the result always depends upon the decimal point position of the first number keyed into the device or the number which had already been present in the register. Thus the decimal point position of the number keyed into the device or which is already present in the register really determines the decimal point of the computer.

In many cases, a mechanically key-operated register, for example, register K in FIGURE 1, is provided which optically indicates the arithmetic device decimal point during the entire course of the computing operation and which is connected with the register D when initiating the operations addition and subtraction and by means of the register distributor 2. Thus, the user does not have to give any attention to regulations regarding the position of the decimal point and receives the result in register A or in a printer 22 connected after register A with the decimal point always in the position preselected by the operator.

Another application of the invention which is particularly suitable for the present invention for the registers is that revolving storage mediums such as a rotating drum or disc having writing heads can be provided and these writing heads are displaced as is known in the art, with respect to the readout heads by the transit time of the pulses through the arithmetic circuit.

Figure 3:
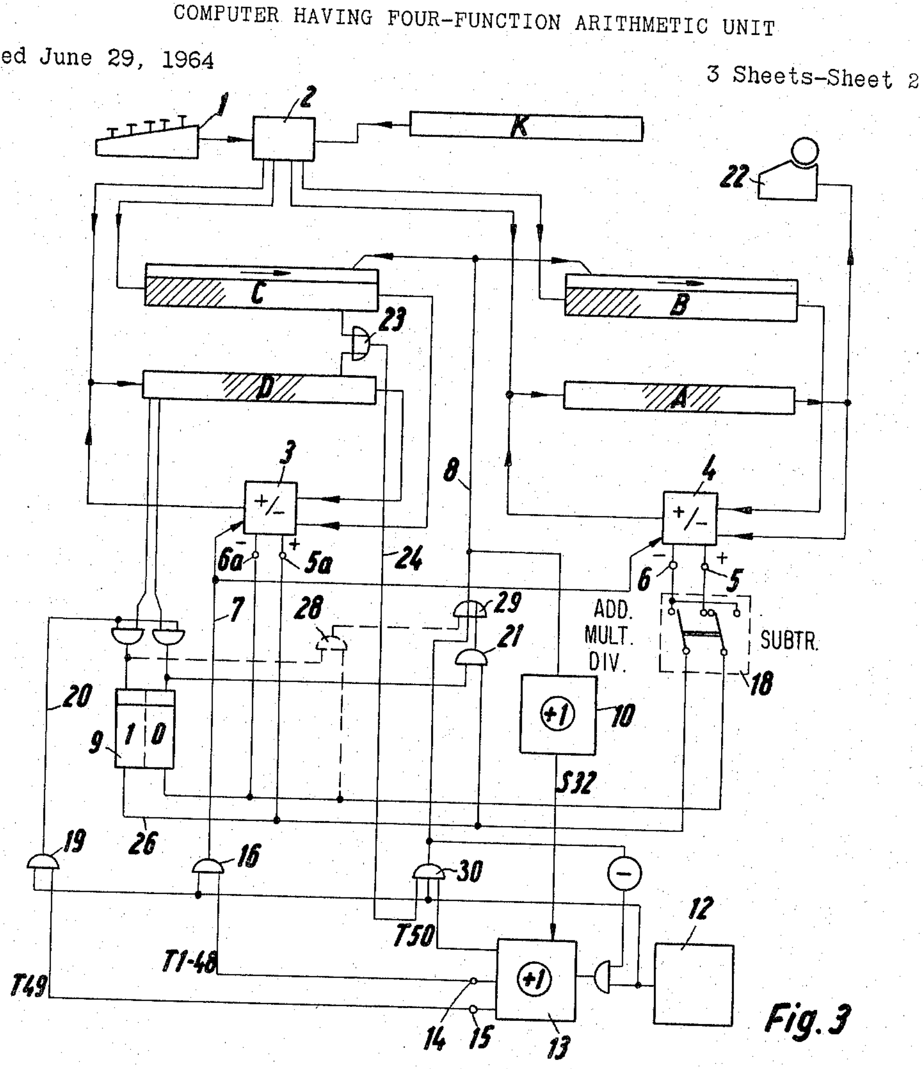
FIGURE 3 is a block circuit diagram of another embodiment of the present invention.

The circuit providing the computing operation of the present invention can be improved in those cases in which the speed of the components is not sufficiently greater than the reaction time of the user, and this can be accomplished by a modification shown in the block diagram circuit of FIGURE 3 where similar elements to FIGURE 1 are provided with identical reference numerals. In this arrangement, the many computing steps which do not contribute toward formation of the actually desired result which led to the resetting of the previously ambient condition, are omitted by performing a comparison between registers C and D before each computing step. This comparison permits a computing step only when the contents of the register C is smaller or equal to that of register D. The comparison circuit network is symbolically indicated by means of a single gate 23 which connects two positions of the registers D and C which are in corresponding locations in the two registers. The output line 24 of the comparison circuit network for all digit positions is always excited when the contents of register C is larger than that of register D before a computing step. Comparison circuit networks which emit a signal when the contents of a first register is larger than that of a second register are known in the art of logical networks.

The clock pulse counter 13 is provided for this purpose with a counting cycle which is extended by one clock pulse and has a further output T50 which is excited during the fiftieth clock pulse. At this instant, the comparison operation is always performed and a shifting pulse is immediately transmitted to line 8 via AND-gate 30 and OR-gate 29 if the contents of register C is larger than that of register D. At the same time, the clock pulse counter is held in position T50 and shifting steps are triggered as long as the comparison does not produce the opposite result, that is, as long as the contents of register C is still larger than that of register D. Only when this is no longer true is the clock pulse counter again freed and the next real computing step may be run off and contribute to the computation results.

The present invention was explained above with reference to static registers which had a multiple word length. However, since most of the time only a single word length is occupied by essential digits, the multiple length arithmetic registers can be replaced by shorter ones which have only one word length, and the shift control can be replaced by a delay line control. In this case, the non-shaded regions of FIGURES 1 and 2 are to be read as representing delay-lines with an input (left) and an output (right) for the bit sequences, such delay lines being known in the art in different forms. In the case of revolving storage mediums, the delay can be accomplished by displacing various reading and writing heads with respect to one another.

Figure 4:
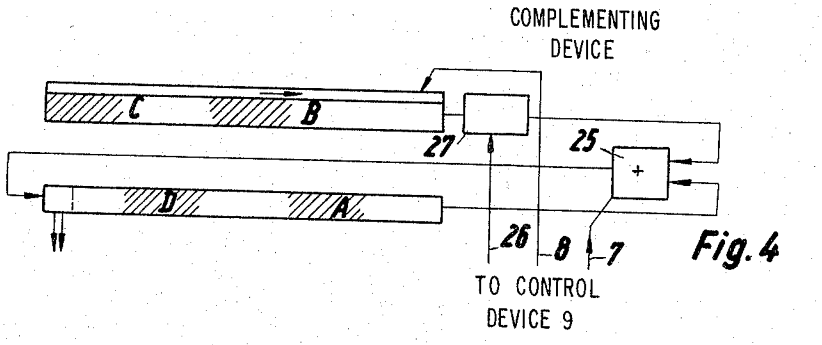
FIGURE 4 is a block diagram of a portion of the invention illustrating another modification thereof.

Furthermore, the invention is not limited to computing operands which have only positive signs. Rather, all known manners of representing negative numbers can also be used and one particularly suitable example is the complement representation which even leads to a particularly favorable arrangement. Since the clock pulse line 7 for arithmetic circuits 3 and 4 and the clock pulse line 8 for the shifting steps are connected at the same time to the left and right registers in FIGURES 1 and 3, and therefore all operations are applied to both register pairs A/B and C/D at the same time, the registers A and D as well as B and C may be coupled to form two registers of multiple length and one third of a respective register can be omitted at the connection point of the two registers to form one register. Negative operands as well as positive operands to be subtracted and also negative results are then represented in complement form and adding steps are always carried out. In case of a change in sign in register portion D the resetting operation is initiated by complementing the figures present in the register portions B and C. FIGURE 4 shows the two combined registers with a single arithmetic circuit 25 and a complementing device 27 which is actuated by the line 26 controlled by control element 9 which is not shown in this figure. The remaining portions of the arithmetic unit including the shift counter and the clock control are connected in this arrangement in similar fashion as shown in FIGURES 1 and 3.

Figure 5:
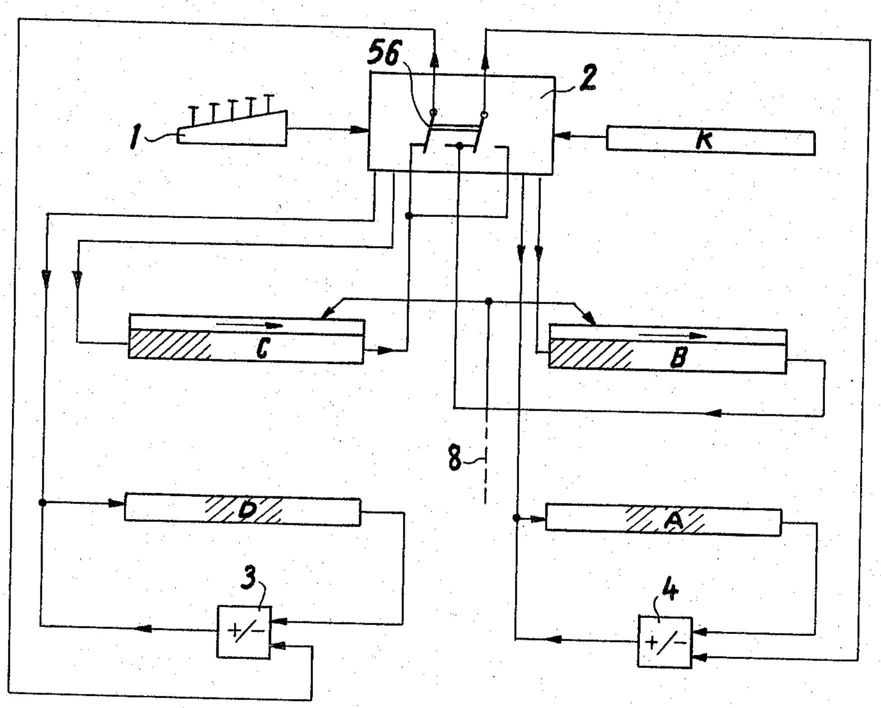
FIGURE 5 is a block diagram of a portion of the invention illustrating another modification thereof.

In a modification of the invention the register distributor 2 can be made effective in such a manner that it exchanges connections of registers of a register pair to the two arithmetic units in order to select the basic function of arithmetic. Particularly when exchanging the outputs of registers B and C multiplication becomes division. In FIGURE 5 means to effect this are illustrated. The block circuit diagram FIGURE 5 shows a portion of FIGURE 1 with the registers A, B, C, D and K, the register selector 2, the arithmetic units 3 and 4, the key input 1, and the main connections as already described, but with the following exceptions: the outputs of the registers B and C and one input of each of the arithmetic units 3 and 4 are connected to the register selector 2. A throw-over switch 56 which may be a mechanical switch as illustrated or an electronic switch and forming part of the register selector 2 connects in its one position (as shown) the output of the register C to the arithmetic unit 3 and the output of the register B to the arithmetic unit 4. In its other position, it connects the output of register C to the arithmetic unit 4 and the output of register B to the arithmetic unit 3. Thus, by adjusting switch 56 it can be selected whether a number previously inscribed into one of the registers B or C, e.g. into register B, will become effective as a multiplicand or as a divisor, and there is no necessity of transferring said number into a predetermined one of the two registers before starting the desired arithmetic operation.

If the results are always to be obtained in the same register A then the register distributor is to be made effective only for the first computing step in such a manner that after this step the register contents will read as indicated in Table I to IV.

It should be noted that in place of the sequence described above of computing step, resetting, shifting step, a sequence of computing step, shifting step, operation reversal, will also provide the correct result. The term "operation reversal" means switching the bistable control element which had previously caused the resetting step. However, since this shifting step is carried out before resetting, a type of division is produced without resetting of the remainder.

In comparison to the arrangements described with reference to FIGURES 1, 3, and 4, only a further AND-gate 28 is required for this type of control and such a gate is illustrated in dashed lines in FIGURE 3, and is open when control element 9 is actuated. The output of this gate also influences line 8 via OR-gate 29 so that this line is now excited at each change of sign to plus or minus as is required for this type of construction.

Although the present invention has been described with reference to a decimal and binary arithmetic device, respectively, this only refers to the digit system most commonly required but the device is not limited to these. Furthermore, the exact coding of the decimal digit in tetrads or pentads is not specifically declosed since the type of coding does not have any influence on the computation operation control of the arrangement of the present invention but only exerts influence upon the construction of the arithmetic circuit. The invention is also not restricted to a particular type of transmission of the binary or decimal digits, since parallel, serial or series-parallel arrangements can be used.

It will be understood that the above description of the present invention is susceptible to various modifications, changes, and adaptations, and the same are intended to be comprehended within the meaning and range of equivalents of the appended claims.

What is claimed is:

1. An electronic four-function arithmetic unit having registers for containing in binary form numbers to be calculated, comprising, in combination:

four registers A, B, C, D;

circuit control means connected to the registers for carrying out the arithmetic step $$(a \pm b)\frac{d}{c}$$

where *a, b, c,* and *d* are the contents of the respective registers; and means for filling two of the registers selectively with unit values and zeros for carrying out one of the basic arithmetic functions, said circuit control means being fixedly connected with the registers so that the selection of the basic arithmetic function influences the distribution of the numbers, unit values and zeros upon the registers only at the latest at the start of the computing operation, said circuit control means including at least one arithmetic unit, the four registers being connected in pairs A and D, and B and C, respectively, to form shift registers, means for feeding the number to be calculated which is fed to register C in complement form, said arithmetic circuit being arranged to add the numbers coming from the shift registers and to feed the result of the addition back to the first-mentioned shift register (A and D), and said circuit control means including a complementing circuit selectively actuatable between the last-mentioned shift register (B and C) and the arithmetic circuit in dependence upon the plus or minus sign in the first-mentioned shift register (A and D).

2. An electronic four-function arithmetic unit having registers for containing in binary form numbers to be calculated, comprising, in combination:

four registers A, B, C, D;

circuit control means connected to the registers for carrying out the arithmetic step $$(a\pm b)\frac{d}{c}$$

where $a$, $b$, $c$, and $d$ are the contents of the respective registers;

means for filling two of the registers selectively with unit values and zeros for carrying out one of the basic arithmetic functions, said circuit control means being fixedly connected with the registers so that the selection of the basic arithmetic function influences the distribution of the numbers, unit values and zeros upon the registers only at the latest at the start of the computing operation, said circuit control means including at least one arithmetic unit; and means for feeding at least one of the two numbers to be computed in accordance with one of the basic arithmetic functions in floating decimal point notation to place the numerical digits of the number in one of said registers and the decimal point of this number as the "1" of the numerical system employed in a position of another register corresponding to the "ones" position of the number and arranged so that the "1" significant of the decimal point is treated in this register position as though it were an arithmetic number.

3. A unit as defined in claim 2 wherein said circuit control means include means for connecting the four registers in pairs with the arithmetic circuit for carrying out the arithmetic instruction $$(a\pm b)\frac{d}{c}\longrightarrow a$$

where the arrow means "result appears as";

means for controlling the arithmetic circuit to form the sum $a+b\rightarrow a$, and when subtracting, the difference $a-b\rightarrow a$, as often as the difference $d-c\rightarrow d$ which is formed as many times as the sum or difference, does not result in a change in the plus or minus sign;

means for cancelling a computing step which causes a change in sign in register D;

means for shifting the contents of registers B and C by respectively one digit position in the direction of lower digit positions after the cancelling means are actuated, after which the above-mentioned sums and differences are again formed; and counter means for counting the number of shifts and terminating the computing operation after a certain number of shifts.

4. A unit as defined in claim 3 wherein said circuit control means includes monitoring means for sensing a sign change in register D and for actuating first said cancelling means and then said shifting means.

5. A unit as defined in claim 2 wherein said circuit control means include means for connecting the four registers in pairs with the arithmetic circuit for carrying out the arithmetic instruction $$(a\pm b)\frac{d}{c}\longrightarrow a$$

where the arrow means "result appears as";

means for controlling the arithmetic circuit to form the sum $a+b\rightarrow a$, and when substracting, the difference $a-b\rightarrow a$, as often as the difference $d-c\rightarrow d$ which is formed as many times as the sum or difference does not result in a change in the plus or minus sign;

means for shifting the contents of registers B and C by respectively one digit position in the direction of lower digit positions before a change of the sign in register D takes place after which the above-mentioned sums and differences are again formed; and counter means for counting the number of shifts and terminating the computing operation after a certain number of shifts.

6. A unit as defined in claim 5 wherein each of the registers has the same number of digit positions and which is at least double the number of digit positions as the numbers to be computed and the resulting numbers, and wherein said feeding means always fills the registers B and C with numbers to be computed in a digit position which is of higher value than the digit positions of the numbers in the remaining registers so that the contents of register C is always at first larger than the contents of register D.

7. A unit as defined in claim 5 wherein the registers are arranged to be shiftable, and further comprising delay means for transmitting the numbers in the registers B and C to the arithmetic circuit so that they are delayed with respect to the numbers in registers A and D by a selectable number of value positions.

8. A unit as defined in claim 5 wherein said circuit control means further includes comparison means for comparing the numbers in registers C and D with each other and for actuating said shifting means as long as the number in register D is smaller than that in register C.

9. A unit as defined in claim 2 wherein said circuit control means include means for connecting the four registers in pairs with the arithmetic circuit for carrying out the arithmetic instruction $$(a\pm b)\frac{d}{c}\rightarrow a$$

where the arrow means "result appears as";

means for controlling the arithmetic circuit to form the sum $a+b\rightarrow a$, and when subtracting, the difference $a-b\rightarrow a$, as often as the difference $d-c\rightarrow d$ which is formed as many times as the sum or difference does not result in a change in the plus or minus sign;

means for multiplying the contents of registers B and C by (−1) and for shifting the contents by respectively one digit position in the direction of lower digit positions after a change of the sign in register D takes place, after whch the abovementioned sums and differences are again formed; and counter means for counting the number of shifts and terminating the computing operation after a certain number of shifts.

10. A unit as defined in claim 9 wherein each of the registers has the same number of digit positions and which is at least double the number of digit positions as the numbers to be computed and the resulting numbers, and wherein said feeding means always fills the registers B and C with numbers to be computed in a digit position which is of higher value than the digit positions of the numbers in the remaining registers so that the contents of register C is always at first larger than the contents of register D.

11. A unit as defined in claim 10 wherein the registers are arranged to be shiftable, and further comprising delay means for transmitting the numbers in the registers B and C to the arithmetic circuit so that they are delayed with respect to the numbers in registers A and D by a selectable number of value positions.

12. A unit as defined in claim 2 comprising a fifth mechanically adjustable register having the same number of digit positions as the other registers and arranged to have the decimal point of the number in register A fed to it before the computing operation by marking the position assigned to the lowest whole digit position of the number in register A or B so that the result is formed taking into consideration the decimal point position which is fed in.

13. A unit as defined in claim 12 wherein said control circuit means, said feeding means, and said fifth register are arranged so that addition and subtraction respectively of the numbers in registers A and B is carried out when, before the beginning of the computing operation, the decimal point position is transferred from the fifth register into the "ones" position of register D in the form of a "1" and when the decimal point of the number present in register B arrives as "1" in that position of register C corresponding to the "ones" position of the number.

14. A unit as defined in claim 13 wherein said control circuit means, said feeding means, and said fifth register are arranged so that multiplication is carried out between the number in register B and the number normalized to the arithmetic decimal point in register D when, before the beginning of the computing operation, the decimal point of the number in register B arrives as "1" at the position of register C corresponding to the "ones" position of the number while "0" arrives in register A.

15. A unit as defined in claim 13 wherein said control circuit means, said feeding means, and said fifth register are arranged so that division takes place between a dividend present in register D and normalized to the arithmetic decimal point and a division in register C when, before the beginning of the computing process, the decimal point of the number in register C arrives as "1" at the position of register B corresponding to the "ones" position of the number while "0" arrives in register A.

16. An arithmetic unit, comprising, in combination:

(a) four registers A, B, C, and D; and (b) circuit control means for carrying out the arithmetic step $$(a \pm b)\frac{d}{c}$$

where $a$, $b$, $c$, and $d$ are the contents of the respective registers and only two registers have numerical computation content and the other two selectively have unit values and zeros, said circuit control means including an arithmetic circuit;

means for connecting the four registers in pairs with the arithmetic circuit for carrying out the arithmetic instruction $$(a \pm b)\frac{d}{c} \rightarrow a$$

where the arrow means "result appears as";

means for controlling the arithmetic circuit to form the sum $a+b \rightarrow a$, and when subtracting, the difference $a-b \rightarrow a$, as often as the difference $d-c \rightarrow d$ which is formed as many times as the sum or difference, does not result in a change in the plus or minus sign;

means for cancelling a computing step which causes a change in sign in register D;

means for shifting the contents of registers B and C by respectively one digit position in the direction of lower digit positions after the cancelling means are actuated, after which the above-mentioned sums and differences are again formed; and counter means for counting the number of shifts and terminating the computing operation after a certain number of shifts.

17. An arithmetic unit, comprising, in combination:

(a) four registers A, B, C, and D; and (b) circuit control means for carrying out the arithmetic step $$(a \pm b)\frac{d}{c}$$

where $a$, $b$, $c$, and $d$ are the contents of the respective registers and only two registers have numerical computation content and the other two selectively have unit values, and zeros, said circuit control means including an arithmetic circuit, means for connecting the four registers in pairs with the arithmetic circuit for carrying out the arithmetic instruction $$(a \pm b)\frac{d}{c} \longrightarrow a$$

where the arrow means "result appears as";

means for controlling the arithmetic circuit to form the sum $a+b \rightarrow a$, and when subtracting, the difference $a-b \rightarrow a$, as often as the difference $d-c \rightarrow d$ which is formed as many times as the sum or difference does not result in a change in the plus or minus sign;

means for shifting the contents of registers B and C by respectively one digit position in the direction of lower digit positions before a change of the sign in register D takes place after which the above-mentioned sums and differences are again formed; and counter means for counting the number of shifts and terminating the computing operation after a certain number of shifts.

18. An arithmetic unit for a computing device comprising, in combination:

a first register A having a digit input and a digit output;

a second register B having a digit input and a digit output as well as a shift-control input;

a third register C having a digit input and a digit output as well as a shift-control input connected with the shift-control input of register B;

a fourth register D having a digit input and a digit output as well as arithmetic sign representing outputs;

a first adder connected to receive the digit outputs from registers C and D for selectively adding and subtracting them, and having a first control input for causing said adder to subtract and a second control input for causing said adder to add, as well as a shift-control input for causing said adder to control said registers to transfer a respective digit into their respective outputs and for placing the result into register D;

a second adder connected to receive the digit outputs from registers A and B for selectively adding and subtracting them, and having a first control input for causing said adder to subtract and a second control input for causing said adder to add, as well as a shift-control input connected with the shift-control input of said first adder for causing said registers A and B to transfer a respective digit into their respective outputs and for placing the result into register A;

a bistable element constructed as a control element for sensing the sign of a number in register D and having two inputs and two outputs each co-ordinated with a respective input, the first output thereof being connected with the subtraction control input for the first adder and the adding control input for the second adder, the other output of the bistable element being connected with the adder input control of the first adder and the subtraction input control of the second adder;

a first AND-gate connected to the first input of the bistable element and having two inputs, one of which is connected with a sign output of register D significant of a positive sign;

a second AND-circuit connected to the second input of the bistable element and having two inputs, one of which is connected to the sign output of register D significant of a negative sign, said second respective inputs to said AND-circuits being connected;

clock-control means for controlling the timing of said unit and including a clock pulse generator and a clock pulse counter arranged to count a number of pulses which is significant of the number of digits in said registers and connected to receive pulses from said clock pulse generator, said clock pulse counter having two gated outputs, the first of which is activated during the number of clock pulses representative of the number of digits in said registers and being off for the remainder of the time and the second of which is activated only for a period of time after the first output has finished being active, said clock pulse counter having a control input for preventing further actuation of the clock pulse counter and thus for terminating a computing operation;

an adder clock pulse circuit including an AND-gate having a first input connected with the first output of said clock pulse counter and a second input connected with the output of the clock pulse generator, and having an output which is connected to said adder shift control inputs;

a sign sensing initiation means including an AND-circuit having a first input connected to the second output of said clock pulse counter and a second input connected to said clock pulse generator and having an output which is connected to said respective AND-circuits connected with said bistable element;

register shift-control means including an AND-circuit having a first input connected to said second bistable element output and a second input connected to said first bistable element input, and having an output connected to said register shift control inputs; and a shift counter having an input connected to said register shift control inputs for counting the number of shifts of registers B and C and thus the computation steps, and having its output connected to the control input of said clock pulse counter.

19. A unit as defined in claim 18 comprising switch means for selectively changing the connections of said second adder first and second control inputs from said second and first bistable element outputs, respectively, to said first and second bistable element outputs, respectively.

20. A unit as defined in claim 19 comprising means for feeding numbers to be calculated into said registers.

References Cited by the Examiner

UNITED STATES PATENTS

| | | | |
|---|---|---|---|
| 2,914,248 | 11/1959 | Ross et al. | 235—157 |
| 3,061,192 | 10/1962 | Terzian | 235—157 |
| 3,249,745 | 5/1966 | Burkhart | 235—160 |

MALCOLM A. MORRISON, *Primary Examiner.*

M. J. SPIVAK, *Assistant Examiner.*